(12) United States Patent
Liao

(10) Patent No.: US 8,646,592 B1
(45) Date of Patent: Feb. 11, 2014

(54) FEEDING CONTROL MECHANISM OF PACKAGING MACHINE

(75) Inventor: Benison Liao, Taipei (TW)

(73) Assignee: Tzu-Chin Hung, Taipei (TW)

( * ) Notice: Subject to any disclaimer, the term of this patent is extended or adjusted under 35 U.S.C. 154(b) by 37 days.

(21) Appl. No.: 13/555,253

(22) Filed: Jul. 23, 2012

(51) Int. Cl.
*B65G 47/26* (2006.01)

(52) U.S. Cl.
USPC ............... 198/469.1; 198/463.4; 198/531; 198/597; 198/633; 198/634; 198/575; 198/460.1; 198/598; 198/474.1; 198/636

(58) Field of Classification Search
USPC ........... 198/448, 451, 452, 575, 626.1, 626.5, 198/626.6, 460.1, 598, 469.1, 463.4, 474.1, 198/531, 530, 597, 633, 634, 636
See application file for complete search history.

(56) References Cited

U.S. PATENT DOCUMENTS

| 3,225,890 | A | * | 12/1965 | Wiese | 198/456 |
| 3,462,823 | A | * | 8/1969 | Heisler | 29/717 |
| 4,638,756 | A | * | 1/1987 | Collmann | 118/215 |
| 7,143,890 | B2 | * | 12/2006 | Pellerin et al. | 198/373 |
| 7,331,444 | B2 | * | 2/2008 | Barilovits et al. | 198/626.3 |

* cited by examiner

*Primary Examiner* — Leslie A Nicholson, III

(74) *Attorney, Agent, or Firm* — Rosenberg, Klein & Lee

(57) ABSTRACT

A feeding control mechanism of packaging machine includes a chassis, a feeding guide, a forwarding device, a conveyor belt, and a feeding controller. The feeding guide is arranged at a front side of the chassis to forward a product into the chassis. The forwarding device includes a feeding channel defined by left and right pulleys for clamping and moving a product onto a conveyor belt. The feeding controller is arranged above the conveyor belt. The product tray carried by the conveyor belt are used to trigger first and second sensor of the chassis to activate the feeding controller for opening/closing stop pegs so as to control each product to be correctly positioned on each product tray of the conveyor belt.

6 Claims, 4 Drawing Sheets

FEEDING CONTROL MECHANISM OF PACKAGING MACHINE

BACKGROUND OF THE INVENTION

1. Field of the Invention

The present invention relates to a feeding control mechanism of packaging machine, and in particular to feeding control mechanism that is used at a feeding terminal of various heat sealing packaging machines to control products to be correctly positioned on product trays of a conveyor belt.

2. The Related Arts

A heat sealing packaging machine is large-sized automatic packaging machinery commonly used in the industrial sector for packaging an object that is manufactured as merchandise with a shrink film and subjecting the packaged object to heating with high temperature air in order to have the shrink film heated and tightly shrink-wrapped the merchandise object. This provides a number of advantages for the packaged object, including improved product stability, better weather durability, easy warehousing and shipping, and protection of outside appearance from undesired damage.

However, there are a huge number of remarkably diversified merchandise products to be packaged in this way at the ends of manufacturing chains of various businesses. These merchandise products are diversified at least in the shape or configuration. The conventional packaging machines are generally not capable enough to handle these products. Especially for certain merchandise products that are of unique shapes, human labor must be used in the operation process of the conventional heat sealing packaging machine to place the products to be packaged on the product tray one by one in order to ensure smooth performance of the subsequent packaging operation. This increases the labor cost and also deteriorates the overall operation efficiency of the packaging machine.

SUMMARY OF THE INVENTION

Thus, the primary object of the present invention is to provide a novel feeding control mechanism of packaging machine, which is for dedicated use in a feeding terminal of all sorts of heat sealing packaging machine to control each product to be correctly positioned on each product tray in order to ensure smooth performance of subsequent packaging process.

Another object of the present invention is to provide a feeding control mechanism of packaging machine, in which components of the machine can be adjusted through a simple operation to correspond to a product to be packaged so as allow a single packaging machine is fit to feeding of merchandise products of various categories.

To achieve the above objects, the present invention adopts the following technical solution:

The present invention provides a feeding control mechanism of packaging machine, which generally comprises a chassis, a feeding guide, a feeding device, a conveyor belt, and a feeding controller.

The chassis supports various components of the feeding control mechanism mounted thereon, including a first sensor and a second sensor that are mounted along one side of a moving path of the conveyor belt mounted in the chassis to detect product trays of the conveyor belt.

The feeding guide is arranged at a front side of the chassis and has a surface at one side of which a feed-in sensor is mounted for detecting a product in order to forward the product to the chassis.

The forwarding device is arranged above the feeding guide and comprises left and right pulleys that are driven by a chassis-containing drive source to constitute a feeding channel, which can clamp and move the product to the conveyor belt.

The conveyor belt is a circulating endless conveyor belt, which travels along a moving path that extends through the chassis and the conveyor belt is provided, in an equally-spaced manner, with a plurality of product trays, each of which carries a product to the subsequent operation of the packaging machine.

The feeding controller is arranged above the conveyor belt and comprises two openable/closable stop pegs that are controlled by a two rocking arms mounted at a front side of the feeding control, whereby the first and second sensors are triggered by the product trays of the conveyor belt to control the opening/closing operations of the stop pegs in order to correctly position each product on each product tray of the conveyor belt.

According to the design of the present invention, the distance between the left and right pulleys of the forwarding device and the opening extent of the two stop pegs at the front side of the feeding controller can be adjusted according to the sizes and specifications of the products to be packaged, so that the feeding control of a single packaging machine is applicable to products of various specifications' to thereby achieve the objects of the present invention mentioned above.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
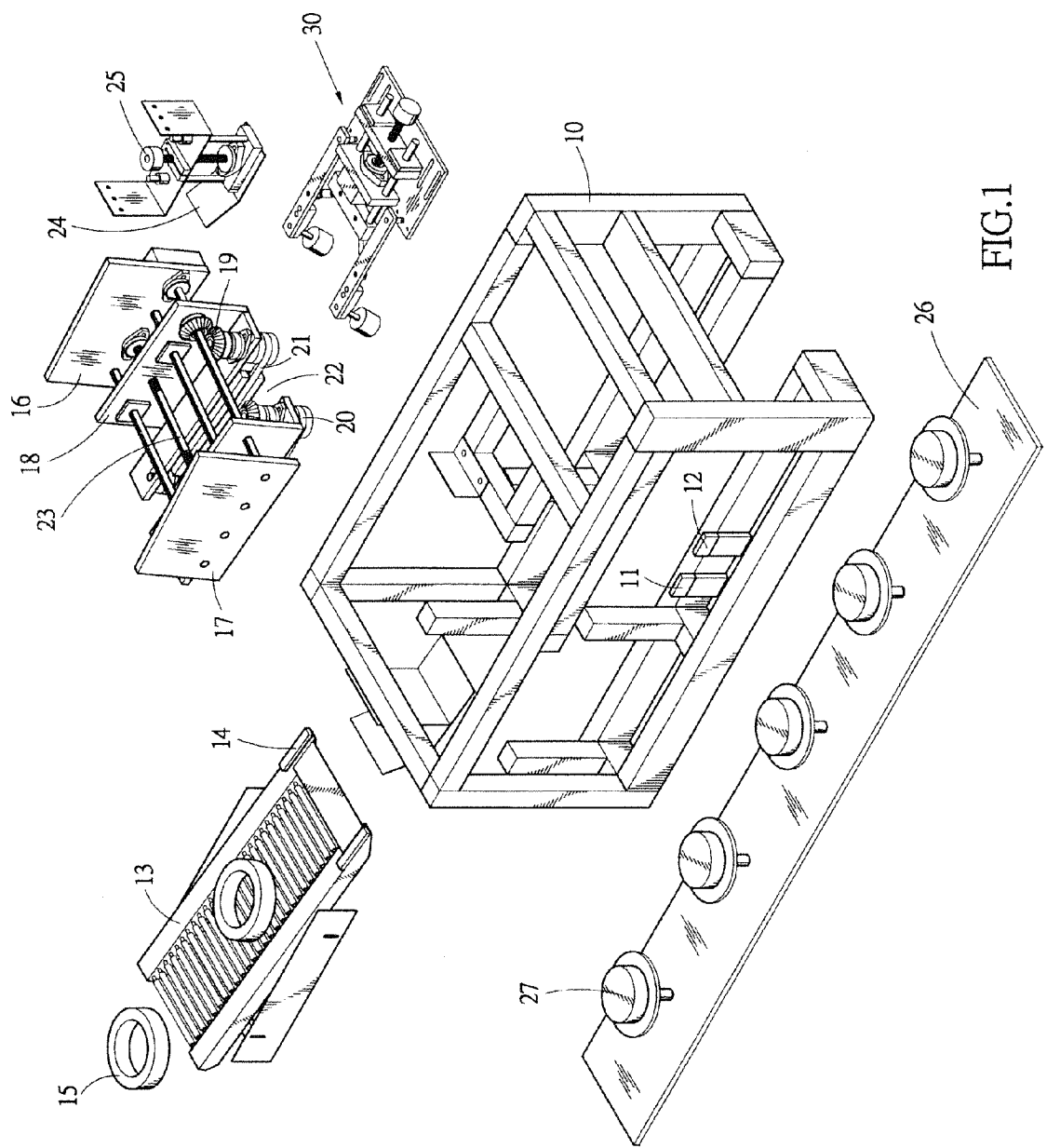
FIG. 1 is an exploded view of a feeding control mechanism of packaging machine according to the present invention.

FIG. 1 of the attached drawings is an exploded view of a feeding control mechanism of packaging machine according to the present invention.

Figure 2:
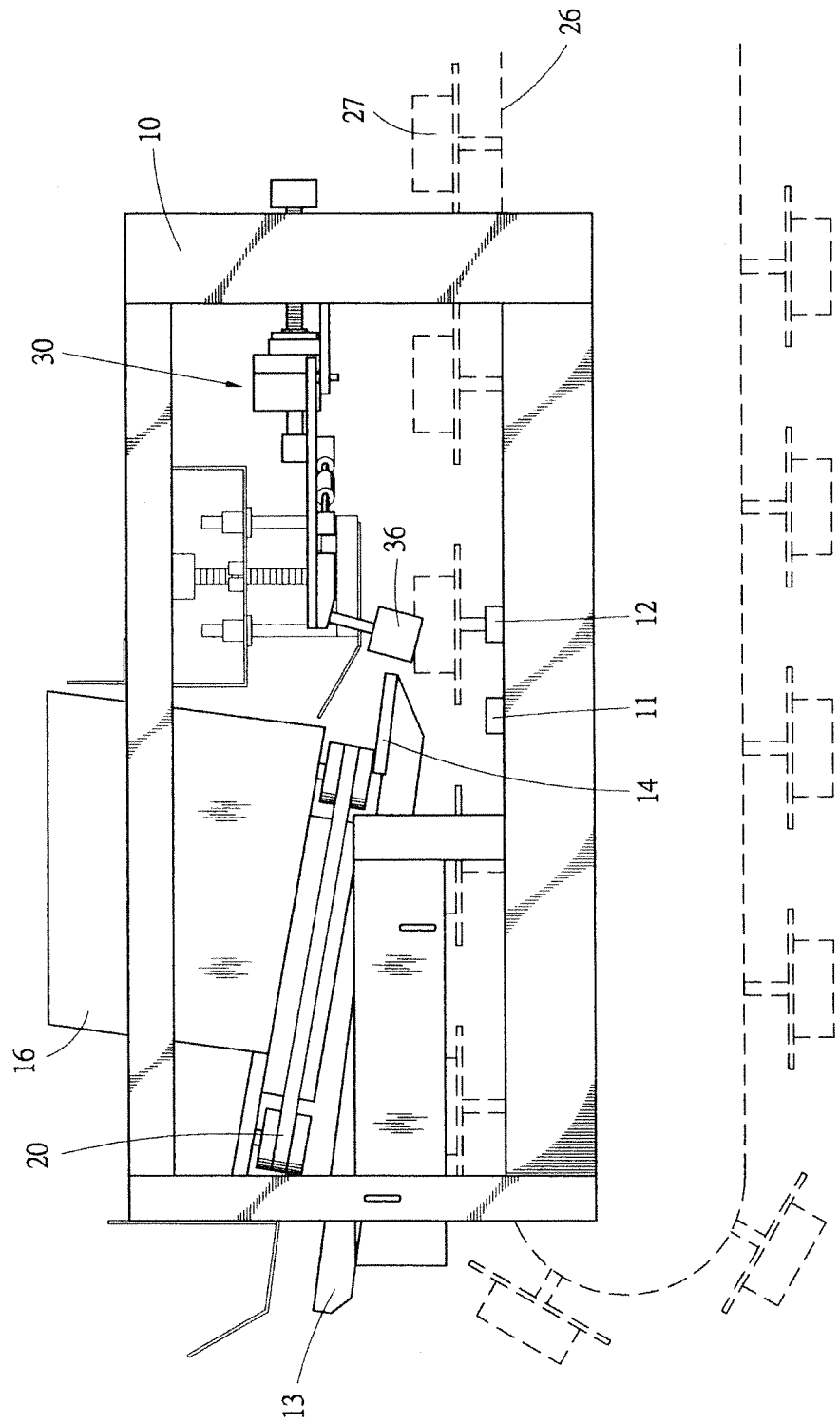
FIG. 2 is a side elevational view of the feeding control mechanism of packaging machine according to the present invention.

FIG. 2 is a side elevational view of the feeding control mechanism of packaging machine according to the present invention.

As shown in FIGS. 1 and 2, the feeding control mechanism of packaging machine according to the present invention generally comprises a chassis 10, a feeding guide 13, a forwarding device 16, a conveyor belt 26, and a feeding controller 30.

As shown in FIG. 1, the chassis 10 supports various components of the feeding control mechanism mounted thereon, including a first sensor 11 and a second sensor 12 that are mounted along one side of a moving path of a conveyor belt 26 mounted in the chassis 11 to detect product trays 27 of the conveyor belt 26.

As shown in FIG. 1, the feeding guide 13 is arranged at a front side of the chassis 10. The feeding guide 13 has a surface at one side of which a feed-in sensor 14 is mounted to detect if a product 15 is located on the feeding guide 13 in order to properly forward each product 15 into the chassis 10.

Further as shown in FIG. 1, the forwarding device 16 is arranged above the feeding guide 13 and comprises a left seat 17 and a right seat 18, which are connected to each other by a plurality of connection bars arranged therebetween in such a way that the left seat 17 and the right seat 18 are spaced from each other by a distance. The two seats are each provided with a gear train 19, and a chassis-containing drive source is coupled, via the gear trains 19, to a left pulley 20 that is located at a lower end of the left seat 17 and a right pulley 21 that is located at a lower end of the right seat 18, in order to drive the two pulleys 20, 21 to simultaneously rotated in opposite direction thereby constituting a feeding channel 22, which can clamp the product 15 located in the feeding guide 13 and can then be controlled by the feeding controller 30 to move the product to a correct position on the conveyor belt 26, as shown in FIG. 2.

As shown in FIG. 1, the forwarding device 16 further comprises a screw 23 that extends between the left seat 17 and the right seat 18. When the chassis-containing drive source is activated, the screw 23 is rotated and the spacing distance between the left seat 17 and the right seat 18 can be increased or decreased thereby changing the distance between the left pulley 20 and the right pulley 21, namely the width of the feeding channel 22, to accommodate products 15 of various widths.

Further, located above a rear end of the forwarding device 16, an upper guide board 24 is set above the chassis 10 in such a way that the upper guide board 24 corresponds to an exit opening of the feeding channel 22 to guide each product 15 discharged therefrom in a downward direction to be positioned on the conveyor belt 26. The upper guide board 24 can be adjusted by a rotary knob 25 with a screw to change the vertical position of the upper guide board 24 in order to accommodate products 15 of various heights.

As shown in FIGS. 1 and 2, the conveyor belt 26 is a circulating endless conveyor belt, which travels along a moving path that extends through the chassis 10. The conveyor belt 26 is provided, in an equally-spaced manner, with a plurality of product trays 27, each of which carries a product 15 to the subsequent operation of the packaging machine.

Figure 3:
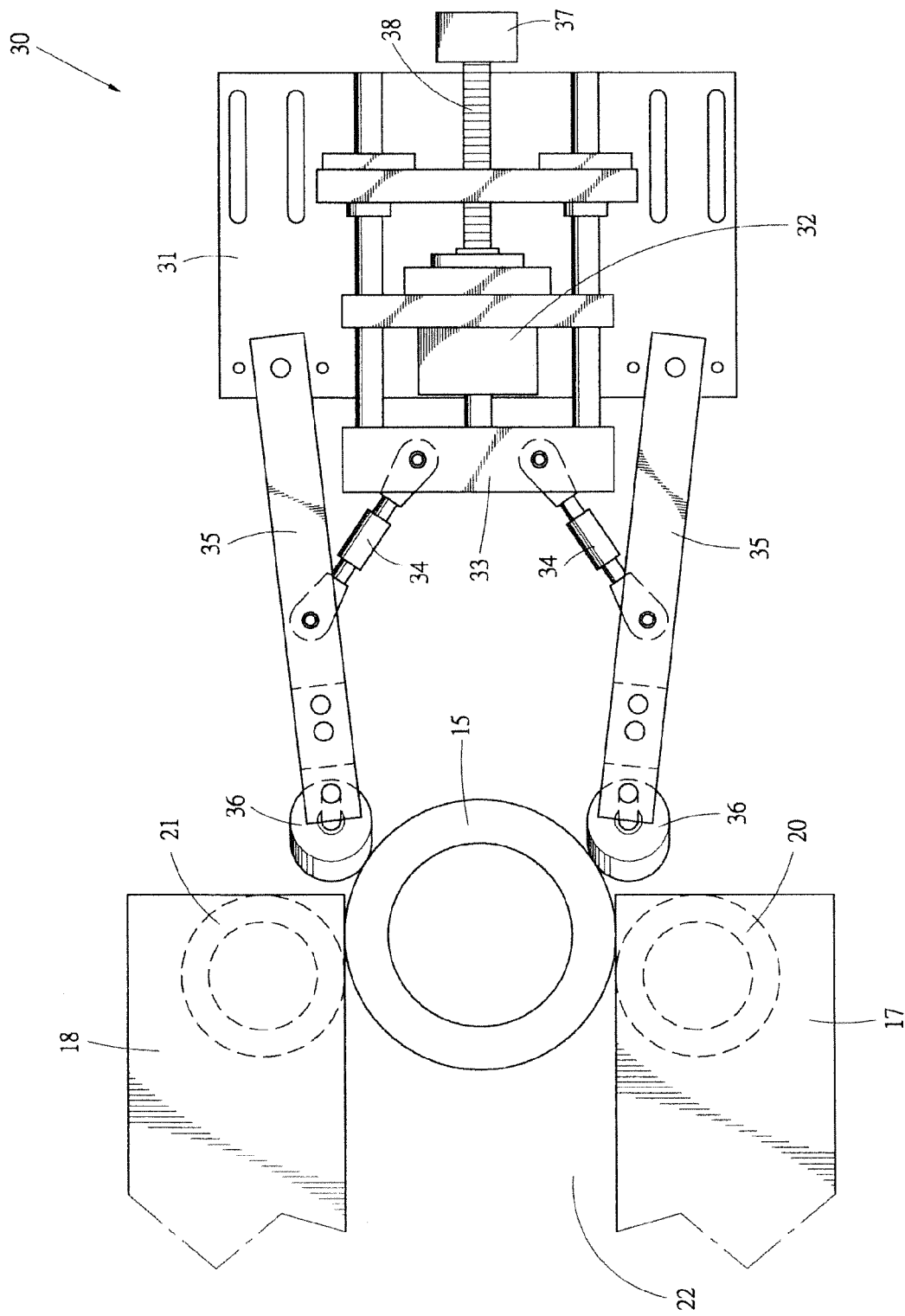
FIG. 3 is schematic view illustrating operation of a feeding controller of the feeding control mechanism of packaging machine according to the present invention.

FIG. 3 is schematic view illustrating operation of the feeding controller 30 of the feeding control mechanism of packaging machine according to the present invention. This drawing shows a condition that two stop pegs 36 that are arranged at the front side of the feeding controller 30 are in a blocking status, which prevents a product 15 from passing.

Figure 4:
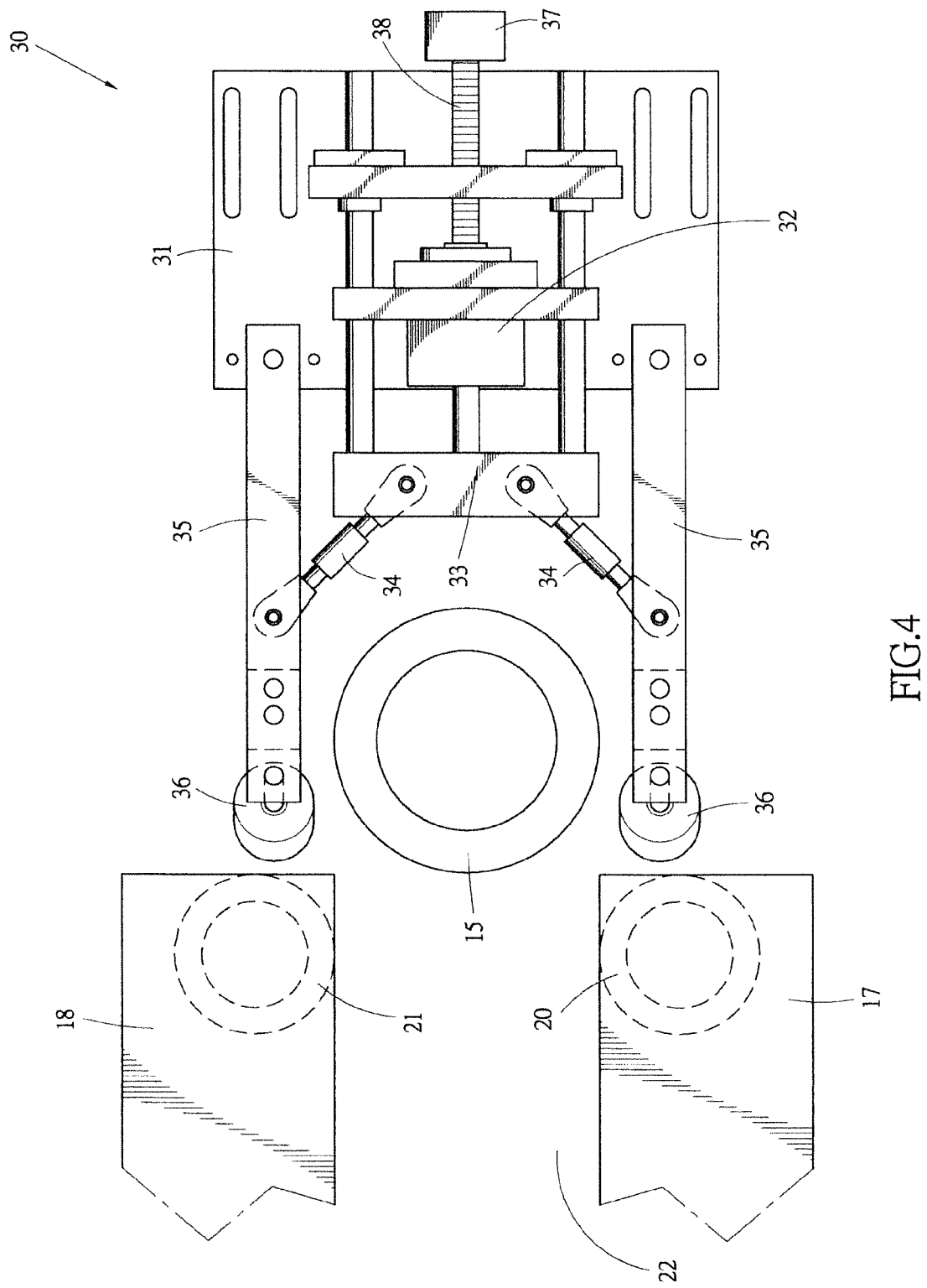
FIG. 4 is a schematic view illustrating operation subsequent to FIG. 3.

FIG. 4 is a schematic view illustrating operation subsequent to FIG. 3. This drawing shows a condition that the two stop pegs 36 arranged at the front side of the feeding controller 30 are in an opening status, allowing a product 15 to pass therethrough.

As shown in FIGS. 1 and 2, the feeding controller 30 is arranged above the conveyor belt 26 at a rear side of the chassis 11 to block or open the feeding channel 22 in order to control each product 15 to be forwarded at a correct timing.

As shown in FIGS. 3 and 4, the feeding controller 30 comprises a planar base 31, which is fixed to the chassis 10. The planar base 31 supports thereon a power cylinder 32, which comprise a push rod that drives a movable seat 33 to cause operations of two link bars 34 and two rocking arms 35 that are arranged opposite to each other at two sides. Each of the link bars 34 has an end pivoted to the movable seat 33 and an opposite end pivoted to a middle portion of the respective rocking arm 35. Each of the rocking arms 35 has a rear end pivoted to the base 31 and a soft stop peg 36 is arranged at a front end of each rocking arm 35.

Further, the feeding controller 30 comprises a rotary knob 37, which is arranged at a rear side of the power cylinder 32 in such a way that rotating the rotary knob 37 changes, via a screw 38, the position of the power cylinder 32 on the base 31. Thus, when the position of the power cylinder 32 on the base 31 is changed, the amplitude between blocking and opening status of the two stop pegs 36 is changed in order to allow the feeding controller 30 to accommodate products 15 of various size specifications.

The operation of the feeding controller 30 is such that when the power cylinder 32 pulls the movable seat 33 to move rearward, the two link bars 34 move the two rocking arms 35 to reduce the distance between the stop pegs 36 at the front ends of the two rocking arms 35, as shown in FIG. 3, and a blocking status is presented to prevent the products 15 on the feeding channel 22 from passing therethrough. On the other hand, when the power cylinder 32 pushes the movable seat 33 to move forward, the two link bars 34 move the two rocking arms 35 to expand the distance between the stop pegs 36 at the front ends of the two rocking arm 35, as shown in FIG. 4, and the feeding channel 22 is open to allow the products 15 to pass therethrough.

The present invention, as described above, provides the following operation. The feed-in sensor 14 provided on the feeding guide 13 detects if a product 15 is located in the feeding guide 13 in order to determine if to run the conveyor belt 26. The first sensor 11 and the second sensor 12 that are mounted along one side of the moving path of the conveyor belt 26 detect the product trays 27 of the conveyor belt 26. When the conveyor belt 26 is running, the first sensor 11 detects a product tray 27 passing and the feeding controller 30 is activated to make the power cylinder 32 controlling the stop pegs 36 for opening the feeding channel 22, as shown in Figure, whereby the product 15 is allowed to pass and exactly falls onto the product tray 27 of the conveyor belt 26. At this moment, the second sensor 12 subsequently detects the same product tray 27 passing and the feeding controller 30 is activated again to make the power cylinder 32 controlling the stop pegs 36 back to the blocking status, as shown in FIG. 3, whereby the next product 15 is stopped in the feeding channel 22 until the next product tray 27 of the conveyor belt 26 moves in and is detected by the first sensor 11.

The present invention provides a feeding control mechanism, which can cyclically operate according to above described process so that each of the products 15 to be packaged can be precisely positioned on each of the product trays 27 of the conveyor belt 26 to be carried by the conveyor belt 26 to the subsequent packaging operation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A feeding control mechanism of packaging machine, comprising:

a chassis, which supports components of the feeding control mechanism thereon and comprises a first sensor and a second sensor mounted along one side of a moving path of a conveyor belt mounted in the chassis to detect product trays of the conveyor belt;

a feeding guide, which is arranged at a front side of the chassis and has a surface at one side of which a feed-in sensor is mounted to detect if a product is located in the feeding guide;

a forwarding device, which is arranged above the feeding guide and comprises a feeding channel that is operable to clamp the product located in the feeding guide and is controlled by a feeding controller to move the product a correct position on the conveyor belt;

a conveyor belt, which is a circulating endless conveyor belt traveling along the moving path the extend through the chassis, the conveyor belt being provided, in an equally-spaced manner, with a plurality of product trays, each of which carries a product to a subsequent operation of the packaging machine; and a feeding controller, which is arranged above the conveyor belt at a rear side of the chassis to block or open the feeding channel in order to control each product to be forwarded at a correct timing.

2. The feeding control mechanism of packaging machine as claimed in claim 1, wherein the forwarding device comprises a left seat and a right seat, which are connected to each other by a plurality of connection bars arranged therebetween in such a way that the left seat and the right seat are spaced from each other by a distance, the two seats being each provided with a gear train, a chassis-containing drive source being coupled, via the gear trains, to a left pulley that is located at a lower end of the left seat and a right pulley that is located at a lower end of the right seat, in order to drive the two pulleys to simultaneously rotated in opposite direction thereby constituting the feeding channel.

3. The feeding control mechanism of packaging machine as claimed in claim 1 or 2, wherein the forwarding device comprises a screw that extends between the left seat and the right seat, whereby when the chassis-containing drive source is activated, the screw is rotated and a spacing distance between the left seat and the right seat is changed thereby changing a distance between the left pulley and the right pulley, namely width of the feeding channel, to accommodate products of various widths.

4. The feeding control mechanism of packaging machine as claimed in claim 1, wherein the forwarding device comprises an upper guide board that is located above a rear end of the forwarding device and set above the chassis in such a way that the upper guide board corresponds to an exit opening of the feeding channel to guide each product discharged therefrom in a downward direction to be positioned on the conveyor belt, the upper guide board being adjustable by a rotary knob with a screw to change vertical position of the upper guide board in order to accommodate products of various heights.

5. The feeding control mechanism of packaging machine as claimed in claim 1, wherein the feeding controller comprises a planar base, which is fixed to the chassis, the planar base supporting thereon a power cylinder, which comprise a push rod that drives a movable seat to cause operations of two link bars and two rocking arms that are arranged opposite to each other at two sides, each of the link bars having an end pivoted to the movable seat and an opposite end pivoted to a middle portion of the respective rocking arm, each of the rocking arms having a rear end pivoted to the base, a soft stop peg being arranged at a front end of each of the rocking arms.

6. The feeding control mechanism of packaging machine as claimed in claim 1 or 5, wherein the feeding controller comprise a rotary knob, which is arranged at a rear side of the power cylinder in such a way that rotating the rotary knob changes, via a screw, position of the power cylinder on the base in order to change amplitude between blocking and opening status of the two stop pegs to thereby allow the feeding controller to accommodate products of various size specifications.

\* \* \* \* \*